United States Patent Office 3,533,234
Patented Oct. 13, 1970

3,533,234
HYDRAULIC PRESSURE TRANSMITTING DEVICE
Masayuki Futamata, Tokyo-to, and Hideyori Sato, Kawasaki-shi, Japan, assignors to Kabushiki Kaisha Komatsu Seisakusho, Tokyo-to, Japan, a corporation of Japan
Filed Aug. 26, 1968, Ser. No. 755,143
Claims priority, application Japan, Aug. 25, 1967, 42/54,255
Int. Cl. F16d *31/06;* F02n *17/00*
U.S. 60—53            3 Claims

ABSTRACT OF THE DISCLOSURE

An auxiliary hydraulic pump operable by hand or foot is connected on its delivery side to hydraulic servo-mechanisms for controllably varying the displacement of at least one combination of a pump and motor of variable-displacement type in a hydraulic power transmission system coupling the engine of a vehicle to its driving wheels, whereby the pump and motor displacements can be varied even when the engine is inoperative.

BACKGROUND OF THE INVENTION

This invention relates to hydraulic power transmission systems and more particularly to a new combination of a hydaulic pressure transmitting device in a hydraulic drive system driven by a prime mover and including at least one pump and one motor whose displacements are variable by respective hydraulic servomechanisms which are operable by the pressure transmitting device even when the prime mover is inoperative.

In general, a hydraulic power transmission system, such as, for example, that for driving an engine-driven vehicle, has at least one pump and at least one motor of fixed-displacement and/or variable-displacement type, and the running operation of the vehicle is controlled by varying the displacement of the pump and/or motor.

However, as the pump and motor size increases, the power required for varying the capacity becomes large. Accordingly, it is a common practice to use hydraulic servomechanisms for this purpose and to use hydraulic pressure generated by a pump driven by the vehicle engine as the power source for these servomechanisms. This practice, however, has heretofore been accompanied by the following difficulties since the servomechanisms do not operate when the engine is inoperative.

1. The vehicle engine cannot be started by towing or running down a slope when the engine starting device is out of order, the storage battery has been excessively discharged, or there is some other failure in the starting system. That is, to start the engine of a hydraulic power transmission vehicle by towing, the vehicle is towed to cause the driving wheels to rotate, thereby causing the hydraulic motor to operate as a pump and the pump to operate as a hydraulic motor and produce a torque by which the engine is rotated and started.

In this case, however, if the pump is in or close to its neutral position of zero displacement, it will not operate as a motor to produce torque. Accordingly, the pump must be maintained in a certain position corresponding to a certain displacement. Furthermore, it is necessary to prevent interruption in the hydraulic fluid flow due to development of negative pressure on the suction side when the motor operates as a pump. Thus, there are certain conditions which must be fulfilled, and it is necessary to vary the pump and motor displacements to suitable values suitably matching the above described towing conditions and various characteristics of the power transmission mechanism. While the engine is inoperative, however, the servomechanisms cannot operate to vary the pump and motor capacities. Therefore, the engine cannot be started by towing.

2. If the engine stops unexpectedly while the power transmission system is operating, the pump and motor will not be in the neutral position of zero displacement but will be in a state corresponding to some speed of travel. Consequently, when an attempt to start the engine by means of the starting system is made, excessive load will be imposed on the system, and starting will become difficult. Furthermore, even if the engine does start, the result is extremely dangerous since the vehicle begins to move simultaneously with the starting rotation of the engine.

SUMMARY OF THE INVENTION

It is an object of the present invention to overcome the above described difficulties by providing a hydraulic pressure transmitting device whereby, by manual power or by some other auxiliary power, the displacement of the hydraulic pump and motor can be varied even when the vehicle engine is inoperative.

According to the present invention, briefly summarized, there is provided, a hydraulic vehicle driving apparatus comprising a variable output hydraulic pump, a hydraulic servomechanism connected to said hydraulic pump for selectively varying its output, a prime mover connected to said hydraulic pump for driving same, a hydraulic motor connected to and driven by said hydraulic pump for driving said hydraulic vehicle driving apparatus, a fluid line connected to said hydraulic servomechanism for supplying operating pressure fluid thereto, an auxiliary power driven hydraulic pump coupled to said fluid line and arranged to generate pressure therein, and a manually operable auxiliary hydraulic pump also coupled to said fluid line for generating pressure therein sufficient to operate said hydraulic servomechanism to vary the output of said hydraulic pump whereby when said prime mover is stopped, said prime mover may be started by another vehicle by tractive starting of said vehicle driving apparatus.

The nature, details, and utility of the invention will be mre clearly apparent from the following detailed description with respect to preferred embodiments of the invention when read in conjunction with the accompanying drawing, in which like parts are designated by like reference numerals.

DETAILED DESCRIPTION

Figure 1:
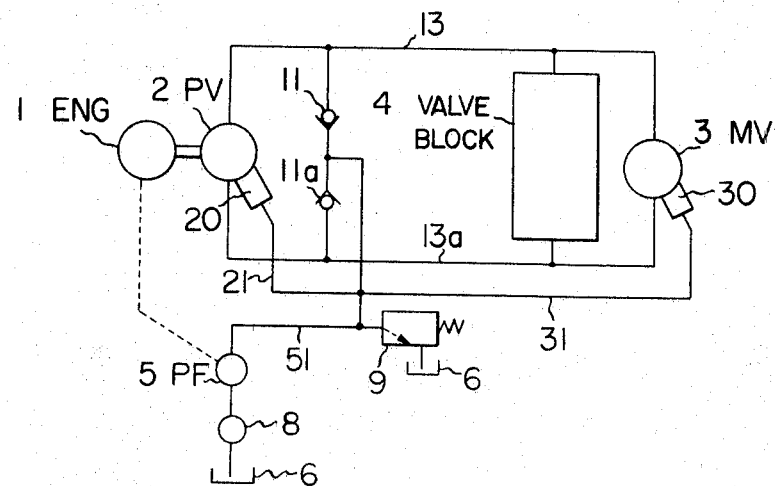
FIG. 1 is a schematic diagram showing the hydraulic circuit of a vehicle driven by an engine through a hydraulic power transmission system.

In the hydraulic power transmission system illustrated in FIG. 1, there is provided a prime mover (an engine 1 in this example), a variable-displacement type hydraulic pump 2, and a variable-displacement type hydraulic motor 3 (or fixed-displacement type hydraulic motor) driven by psessurized hydraulic fluid sent from the pump 2 through a fluid path 13 or 13a. The motor 3 has an output shaft which is coupled to a transmission mechanism (not shown) for driving wheels or caterpillar threads.

A valve block 4 comprising a relief valve and a plurality of other valves is connected between the fluid paths 13 and 13a to assure safe and stable operation of the system. A fixed-displacement type pump 5 driven by the engine 1 draws hydraulic fluid from a reservoir tank 6 through a filter 8 and delivers the fluid through a fluid path 51 and a check valve 11a or 11 to fluid path 13a or 13. The suction pressure of the pump 2 is maintained constant by a relief valve 9, which returns surplus fluid to the tank 6.

The delivery flowrate of the variable-displacement type pump 2 is varied by a hydraulic servomechanism 20, which can be controlled by control levers (not shown) readily manipulable at the operator's seat. The hydraulic pressure constituting the motive power source for this servomechanism 20 is supplied through the fluid path 51 and a path 21. The delivery of the variable-displacement type motor 3 is controlled by a hydraulic servomechanism 30, which is supplied with hydraulic power through the fluid path 51 and a path 31.

Figure 2:
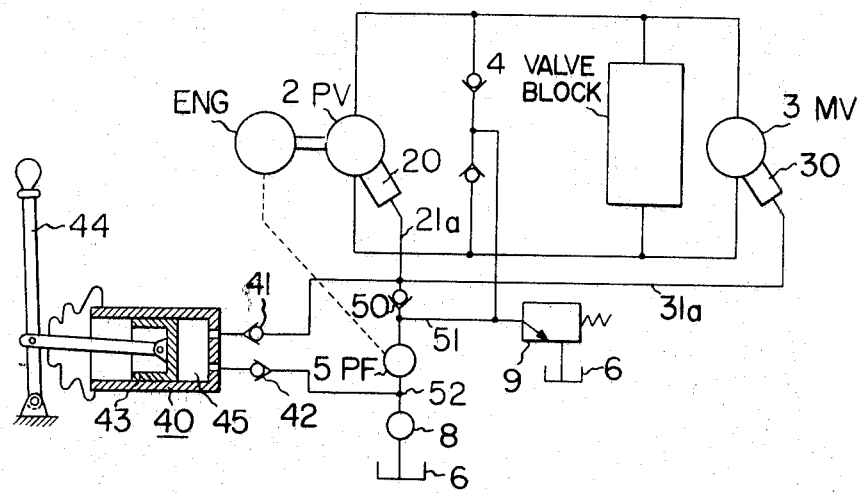
FIG. 2 is a similar schematic diagram showing one example of application of the hydraulic pressure transmitting device of the invention to a system as illustrated in FIG. 1.
Figure 4:
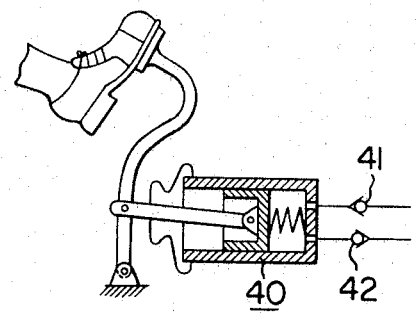
FIG. 4 is a diagrammatic view indicating another mode of actuating the device of the invention.

The hydraulic pressure transmitting device of the invention can be applied to a hydraulic drive vehicle of the above description as illustrated by one example shown in FIG. 2. The device of the invention in this example comprises a hand pump 40 (or a foot-operated pump as shown in FIG. 4) actuated by a lever 44 to draw hydraulic fluid from the tank 6 and through the filter 8, a path 52, and a check valve 42 and to pressurize the fluid within its cylinder 45 and discharge the same through a check valve 41. The pressurized fluid is thereby delivered through paths 21a and 31a to the servomechanisms 20 and 30 of the pump 2 and the motor 3.

The pressurized fluid discharged by the hand pump 40 is prevented by a check valve 50 from escaping through path 51 and pump 5 to other circuits.

Figure 3:
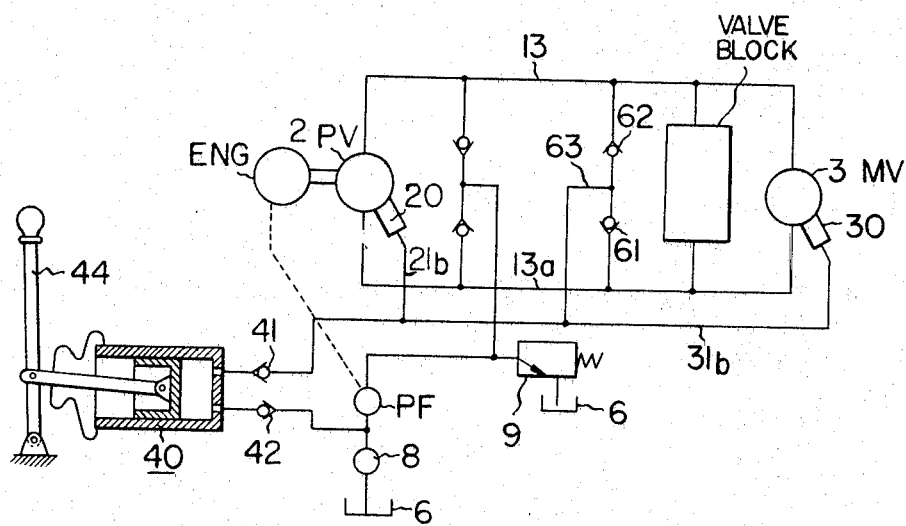
FIG. 3 is a similar schematic diagram showing another embodiment of the invention.

In another embodiment of the invention as illustrated in FIG. 3, hydraulic pressure, which is the motive power source of the servomechanisms 20 and 30 of variable-displacement type pump 2 and motor 3, is derived from the high-pressure side of the system. Similarly as in example shown in FIG. 2, a hand pump 40 is used to deliver hydraulic fluid under pressure through paths 21b and 31b to the servomechanisms 20 and 30 of the pump 2 and motor 3. In addition, the hydraulic pressure of either path 13 and 13a, which is the high-pressure side, is introduced through a check valve 62 or 61 and through a path 63 to the circuit of paths 21b and 31b.

The operation of the hydraulic pressure transmitting device of the above described organization according to the invention will now be described with respect to one example of application in a motor vehicle of hydraulic drive type having a variable-displacement type pump 2 of the so-called hydraulic axial-piston type with a swash plate.

For starting the engine by towing the vehicle, the hand-pump lever 44 is actuated, as the control lever or levers (not shown) of the vehicle for changing travel direction are moved in the direction (forward or reverse) of towing, thereby to supply fluid pressure to the servomechanisms of 20 and 30 to adjust the displacements of the pump 2 and motor 3 to values suitably matching the towing conditions.

The vehicle is then towed. The motor 3 is thereby driven by the torque transmitted thereto from the drive wheels or caterpillar tracks and operates as a pump. The pump 2 is thereby operated as a motor by the hydraulic power from the motor 3 and produces a torque by which the engine is actuated and started.

In the case when the engine unerpectedly stops, hydraulic pressure is supplied by means of the hand pump 40 to the servomechanism 20 thereby to place the swash plate of pump 2 in a neutral position of zero capacity.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. A hydraulic vehicle driving apparatus comprising a variable output hydraulic pump, a hydraulic servomechanism connected to said hydraulic pump for selectively varying its output, a prime mover connected to said hydraulic pump for driving same, a hydraulic motor connected to and driven by said hydraulic pump for driving said hydraulic vehicle driving apparatus, a fluid line connected to said hydraulic servomechanism for supplying operating pressure fluid thereto, an auxiliary power driven hydraulic pump coupled to said fluid line and arranged to generate pressure therein, and a manually operable auxiliary hydraulic pump also coupled to said fluid line for generating pressure therein sufficient to operate said hydraulic servomechanism to vary the output of said hydraulic pump whereby when said prime mover is stopped, said prime mover may be started by another vehicle by tractive starting of said vehicle driving apparatus.

2. A hydraulic vehicle driving apparatus as in claim 1 wherein said auxiliary power driven hydraulic pump and said manually operable auxiliary hydraulic pump are connected in parallel fluid flow connection and a check valve is provided between said auxiliary pumps for preventing backflow of the pressure generated by said manually operable auxiliary hydraulic pump to said auxiliary power drive hydraulic pump.

3. A hydraulic vehicle driving apparatus as in claim 1 wherein said hydraulic motor is a variable output hydraulic motor and further comprising a hydraulic servomechanism connected to said hydraulic motor for selectively varying its output and means connecting said last named servomechanism to said fluid line, said manually operable auxiliary hydraulic pump being arranged to generate pressure sufficient to operate said last named hydraulic servomechanism to vary the output of said hydraulic motor.

References Cited

UNITED STATES PATENTS

| | | |
|---|---|---|
| 2,628,476 | 2/1953 | Grier. |
| 2,886,947 | 5/1959 | Jenny _____ 60—51 |
| 2,970,440 | 2/1961 | Dmitroff et al. _____ 60—51 |
| 3,126,707 | 3/1964 | Hann et al. |
| 3,360,934 | 1/1968 | Moyer et al. |

EDGAR W. GEOGHEGAN, Primary Examiner

U.S. Cl. X.R.

60—19; 123—179